L. E. G. BUEHLER.
SPEED REDUCTION GEAR.
APPLICATION FILED JAN. 27, 1921.

1,408,689.

Patented Mar. 7, 1922.
2 SHEETS—SHEET 1.

Witnesses:
Harry R. L. White
W. P. Kilroy

Inventor:
Louis E. G. Buehler.
By Murray Lotz & Wilson Attys.

L. E. G. BUEHLER.
SPEED REDUCTION GEAR.
APPLICATION FILED JAN. 27, 1921.
1,408,689.
Patented Mar. 7, 1922.
2 SHEETS—SHEET 2.
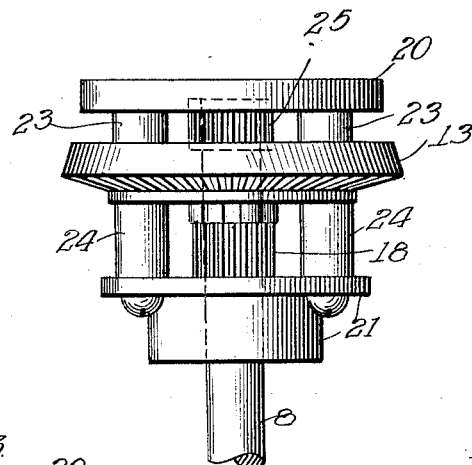
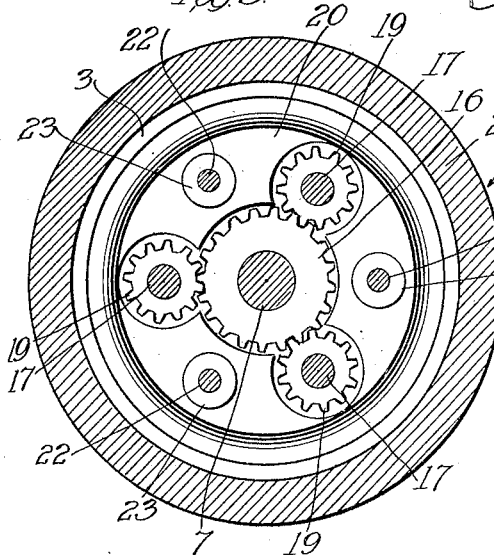
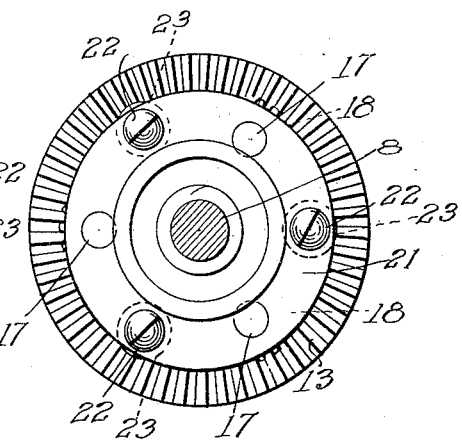
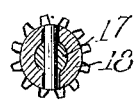
Witnesses:
Harry B. C. White
W. P. Kilroy
Inventor:
Louis E. G. Buehler
By Murray Lotz & Wilson
Att'ys.

UNITED STATES PATENT OFFICE.

LOUIS E. G. BUEHLER, OF CHICAGO, ILLINOIS.

SPEED-REDUCTION GEAR.

1,408,689.　　　Specification of Letters Patent.　　Patented Mar. 7, 1922.

Original application filed January 29, 1920, Serial No. 354,782. Divided and this application filed January 27, 1921. Serial No. 440,259.

*To all whom it may concern:*

Be it known that I, LOUIS E. G. BUEHLER, a citizen of the United States, and a resident of Chicago, in the county of Cook and State of Illinois, have invented certain new and useful Improvements in Speed-Reduction Gears, of which the following is a specification.

My invention relates to power transmissions gears and has special reference to power transmission spur gear sets which are particularly adapted to effect a relatively large reduction in speed.

One important feature of my invention relates to the provision of means whereby the power delivery shaft or shafts are self-locking against rotation by power applied directly thereto, making the device especially useful for hoisting purposes.

Another important feature relates to details of construction and assembly, whereby substantially all of the moving gears are built into a unitary rigid structure removable as a whole from the gear casing.

This present application is a division of my co-pending application, Serial No. 354,782, since matured into Patent No. 1,389,622.

My invention will be made clear by the following description taken in conjuction with the accompanying drawings, in which I have illustrated a preferred embodiment thereof.

In said drawings:—

Figure 3 is a vertical section on the line 3—3 of Figure 1;

Figure 4 is a plan view of the removable gear unit;

Figure 5 is a side elevation of the removable gear unit; and

Figure 6 is a detail section on the line 6—6 of Figure 1.

Figure 1:
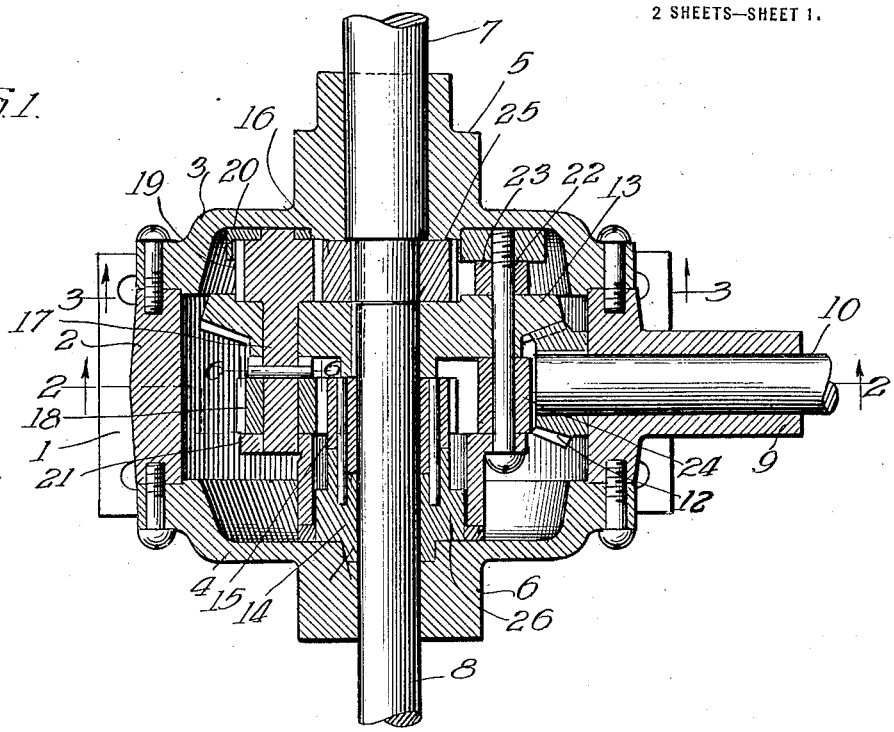
Figure 1 is a plan section of a power transmission gear constructed in accordance with my invention and taken on the line 1—1 of Figure 2.
Figure 2:
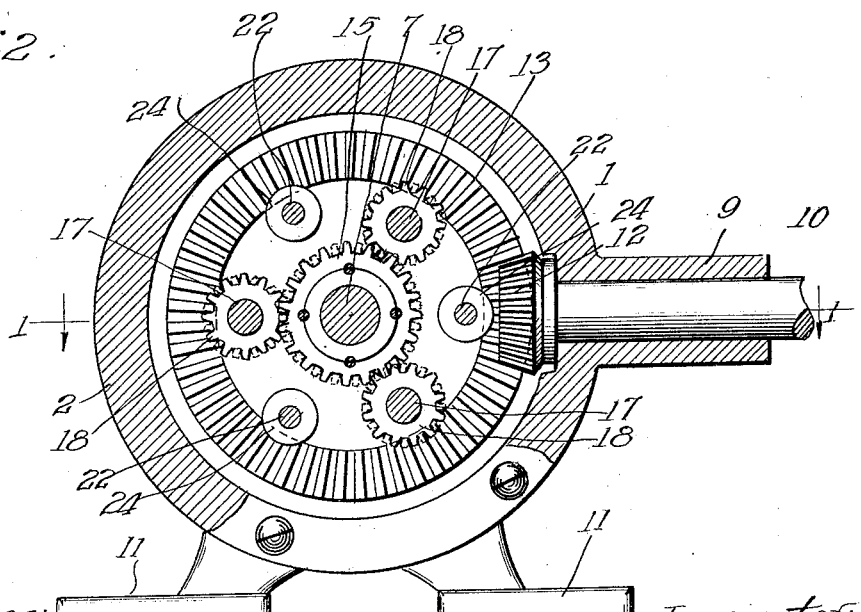
Figure 2 is a vertical section of the same on the line 2—2 of Figure 1.

It should be understood that the use of the terms horizontal, vertical, etc., are merely for the purpose of giving a clear understanding of the form of the device illustrated and in no wise limit the invention except as to the relative positions of the several elements.

The device as illustrated consists of a suitable casing 1 in which the gearing is enclosed and which is designed to contain a suitable lubricative for the several bearings and gears. The casing comprises a cylindrical central shell 2 which for convenience of manufacture and assembly I make open at each end, closing it at one end by a head 3 and at the opposite end a head 4. The heads 3 and 4 are provided with central outwardly projecting hubs 5 and 6 respectively, forming bearings for power delivery shafts 7 and 8 respectively, which constitute the driven or slow speed shafts and between its ends said cylindrical casing 2 is provided with a laterally extending hub projection 9 which constitutes a bearing for a driving or high speed shaft 10. Preferably, though not necessarily, the axis of the shaft 10 is arranged at right angles to the aligned axes of the driven shafts 7 and 8. The casing may be provided with suitable means for rigidly mounting it, such for instance, as the foot brackets 11.

The inner end of the high speed driving shaft 10 carries a bevel pinion 12 which is secured rigidly thereon, either by means of suitable keys or by being made integral therewith. This pinion meshes with a bevel gear 13 which is carried on the inner end of the driven shaft 8, being suitably keyed or otherwise rigidly secured thereon.

The bearing 6 for the shaft 8 is extended within the casing by means of a concentric bearing 14 upon the inner end of which is rigidly mounted a spur pinion 15 by suitable means such as screws 15'. In axial alignment with the pinion 15, which stands still, and through which the shaft 8 projects, I provide a second spur pinion 16 rigidly mounted on the inner end of the driven shaft 7 so that when the pinion 16 is rotated the shaft 7 is likewise rotated.

The shaft 8, as explained, is rotated directly from the driven shaft 10 through the bevel pinion 12 and the bevel gear 13 and is driven at a speed determined by the speed of the shaft 10 and the ratio of these two bevel gears.

For driving the shaft 7 at a much lower speed I provide means which engage the fixed or stationary pinion 15 and the pinion 16 which is fixed to the shaft 7. As a foundation for this slow driving of the shaft 7 I make the two pinions 15 and 16 slightly different in diameter, as shown in the drawings, the pinion 16 is one tooth larger than the pinion 15. The pinion 15 has 19 teeth and the pinion 16 has 20 teeth. By this means I provide a differential speed relation which I make use of for causing the shaft 7 to rotate at a very low speed.

For operatively connecting these differential pinions I provide intermediate planetary shafts 17 mounted in the web of the bevel gear 13 parallel with the axes of the driven shafts 7 and 8. Preferably for the purpose of distributing the strains of the operation in a manner to produce the least side pressure I provide three of these auxiliary or intermediate shafts. Each of the shafts 17 carry rigid therewith two pinions 18 and 19 which are adapted respectively to mesh with the fixed pinion 15 and the pinion 16 carried by the slow speed shaft 7. As shown in the drawings the pinions 18 and 19 are each provided with 12 teeth.

For the purpose of properly supporting the intermediate shafts 17 and the planetary pinions carried thereby I provide a frame consisting of a bearing plate 20 at one end and a similar bearing plate 21 at the opposite end. These plates are made rigid with the bevel gear 13 by means of three bolts 22 spaced between the three shafts 17 and suitable spacers 23 and 24 arranged between the bevel gear and the bearing plates 20, 21 respectively.

The bearing plate 20 is centered on a central projection 25 on the inner surface of the head 3, and the bearing plate 21 is likewise centered on a central projection or bearing 26 on the head 4. The two ends of the shafts 17 enter suitable bearing openings in the two bearing plates and are thereby properly supported and held rigidly in proper relation with each other and to the shafts 7 and 8.

As described the bevel gear 13 is rigid with the shaft 8 and all of the intermediate gears with the bearing plates form a unitary structure carried by the bevel gear 13. Consequently all of this gearing can be entered into and withdrawn from the casing with the shaft 8 as a unitary structure, and all of the several parts are securely supported in proper relative operating positions.

In assembling the gear the fixed spur pinion 15 is first fixed in position on the head 4. The driving shaft 10 with its bevel pinion 12 is then placed in position. The bevel gear 13 is secured to the shaft 8 and the intermediate or palnetary gearing is mounted on the bevel gear which provides the unitary structure illustrated in Figure 5. The shaft 7 is then placed in position with the pinion 16 thereon. The head 4 can be first secured to the casing then the unitary structure can be entered into the casing from the opposite end and then the head 3 with the shaft 7 can be placed in position and secured. The assembling and dissembling of the transmission is very easy.

In operation, as will now be clear, the shaft 8 has a speed slower than the driving shaft by the ratio of the bevel gears 12 and 13.

As the pinion 15 is fixed or stationary the pinions 18 roll around thereon as the bevel gear 13 revolves, thus causing the shafts 17 to rotate on their axes as they are carried around by the bevel gear. In the drawings the pinions 17 and 19 each have twelve teeth and they are formed to properly mesh and work respectively in the spur pinions 15 and 16.

In one rotation of the bevel gear 13 the shafts 17 will be carried bodily around the axial center line of the shaft 7 one revolution. At the same time the shafts 17 will be rotated on their own axes the proportion between the number of teeth on the pinion 18 and the fixed pinion 15, or as 19 to 12, with the result that there will be a rotation of the shaft 7 produced which is proportional to the total number of teeth at the two ends of the shafts 17. As in the present form there are thirty-one teeth at one end and thirty-two teeth at the other the raio will be as 1 to 31 and consequently the speed of the shaft 7 in relation to the speed of the driving shaft 10 will be as 1 to 31 multiplied by the ratio between the gears 12 and 13. Or assuming this latter to be 5 the speed of the shaft 7 will be approximately 1/150th of the speed of the driving shaft 10.

This may be more clearly understood when it is recognized that if the intermeshing gears at the two ends of the shafts 17 were identical the driven shaft 7 would stand still and not rotate at all as the planetary pinions 18 and 19 would roll around the pinions 15 and 16 respectively without disturbing their relative positions. But when we increase the teeth on the pinion 16 one more than the number on the pinion 15 we have caused the shaft 7 to be rotated sufficiently in one revolution of the bevel gear 13 to allow for this difference.

A very important feature of my novel spur gear speed reduction gear is that rotational effort applied directly to the outer drive shaft 7 is not effective to rotate the shaft. In other words, the gear is self-locking as to such source of rotation.

This arises out of the opposite rotational effort which is produced upon the gear 13 by the attempt to rotate the shaft 7 directly.

The first is the bodily rotation of the gear in the same direction as the shaft 7 by reason of the interlock of the pinion 16 with the planetary gears 19, and the other is the effort to rotate the gear 13 in the opposite direction by reason of the engagement of the planetary gears 19 and with the fixed pinion 15. These two opposite rotational efforts result in the absolute locking of the gear with its shaft 8 and consequently the driving shaft 10 against any rotation by reason of rotational effort applied directly to the shaft 7.

As many modifications of my invention will readily suggest themselves to one skilled in the art, I do not limit or confine my invention to the specific details of construction herein shown and described, such being merely typical of a suitable embodiment of my invention.

I claim:

1. In a speed reducing gear, a casing, aligned bearings in the casing, shafts rotatably mounted in said bearings, a third shaft rotatably mounted in bearings on said casing and constituting a driving shaft arranged at an angle to said first shafts, a bevel-toothed pinion rigid with the angular shaft, and an intermeshing bevel-toothed gear rigid with one of said aligned shafts for rotating same, a pinion on the inner end of the other aligned shaft, a fixed pinion within the casing co-axial with said aligned shafts, planetary gears carried by said bevel gear and operatively connecting said fixed pinion and said pinion on the inner end of the aligned shaft, the gear ratios of said planetary gear connections being such as to cause the shaft carrying the pinion to rotate at a relatively low speed.

2. In a spur gear speed reducing mechanism, a casing, two aligned shafts rotatably mounted in the casing, a lateral shaft, beveled gears connecting the lateral shaft with one of the aligned shafts, a fixed pinion co-axial with the aligned shaft carrying the beveled gear, a similar pinion carried by the other aligned shaft, and planetary gears rigidly mounted on the shaft carried by the beveled gear adapted to intermesh with the fixed pinion and the pinion on the aligned shaft, the beveled gear and its aligned shaft with the planetary gears and their shafts forming a unitary structure removable from and replaceable in the casing as a unit.

3. In a spur gear speed reduction device, two aligned driven shafts and a lateral driving shaft, bevel gears connecting the lateral shaft with one of the aligned shafts, a fixed pinion co-axial with the aligned shaft which carries the beveled gear, a similar pinion fixed to the other aligned shaft, planetary shafts journaled in the beveled gear, bearing plates rigid with the beveled gear, one on each side thereof and in which said planetary shafts are rotatably mounted, pinions rigid with said planetary shafts, one on each end of each shaft, the several pinions at one end meshing with the fixed pinions, and the several pinions at the other end of said planetary shaft meshing with said pinion fixed on one of said aligned shafts, the gear ratios of the intermeshing pinions at the two ends of the planetary shafts being different to cause the aligned shaft carrying the pinion fixed thereon to rotate at a relatively low speed.

4. In a spur gear speed reduction device, having a driving shaft and two aligned driven shafts, beveled gears operatively connecting the driving shaft with one of said aligned shafts, a fixed pinion co-axial with said aligned shaft which carries the beveled gear, a similar pinion fixed upon the inner end of the other aligned shaft, planetary gear means carried by the beveled gear and meshing with both of said co-axial pinions, the ratio between said two co-axial pinions being such as to cause the second aligned shaft to rotate when the beveled gear rotates, said second aligned shaft being locked against rotation except as to rotational effort applied through said planetary gear means.

5. A power transmission gear comprising a casing equipped with bearings having axes extending angularly relatively to each other, shafts journaled in said respective bearings, intermeshing bevel gears associated with two of said relatively angularly disposed shafts, a gear element rigid with said casing, planetary idle gears meshing with said rigid gear and operatively engaged with one of said bevel gears for actuation thereby, and spur gear connection between said planetary gears and one of the shafts journaled in one of the bearings of said housing for rotating same at a relatively low speed.

6. A power transmission gear comprising a casing having two axially aligned bearings at opposite ends and a bearing extending laterally thereof, a shaft journaled in each of said bearings intermeshing gear elements rigid respectively with two of said shafts, a gear element rigid with the housing idle gears meshing therewith and operatively associated with one of the first named intermeshing gears for actuation thereby, and means operatively connecting said idle gears with the remaining shaft for actuating the latter at a greatly reduced speed.

7. A power transmission gear comprising a casing having two axially aligned bearings at opposite ends and a bearing extending laterally thereof, a shaft journaled in each of said bearings, a bevel gear rigid with one of the axially aligned shafts, a bevel pinion on the laterally disposed shaft meshing therewith, a gear element rigid with the housing and disposed co-axial with the axially aligned shafts, planetary idle gears meshing with said rigid gear element and operatively associated with said bevel gear for actuation by the latter, and a spur pinion on the other axially aligned shaft operatively associated with said planetary gears for actuation thereby.

Signed at Chicago, in the county of Cook and State of Illinois, this 18th day of January, 1921.

LOUIS E. G. BUEHLER.